United States Patent
Brauer et al.

(10) Patent No.: US 10,038,355 B2
(45) Date of Patent: Jul. 31, 2018

(54) ELECTRIC MACHINE HAVING ROTOR AND STATOR COOLING ASSEMBLY

(71) Applicant: Caterpillar Inc., Peoria, IL (US)

(72) Inventors: Jason Matthew Brauer, West Peoria, IL (US); Jacob Carl Wyss, Eureka, IL (US)

(73) Assignee: Caterpillar Inc., Deerfield, IL (US)

( * ) Notice: Subject to any disclaimer, the term of this patent is extended or adjusted under 35 U.S.C. 154(b) by 283 days.

(21) Appl. No.: 14/794,734

(22) Filed: Jul. 8, 2015

(65) Prior Publication Data

US 2017/0012500 A1 Jan. 12, 2017

(51) Int. Cl.
| | |
|---|---|
| *H02K 9/19* | (2006.01) |
| *H02K 9/00* | (2006.01) |
| *H02K 9/20* | (2006.01) |
| *H02K 9/04* | (2006.01) |
| *H02K 1/32* | (2006.01) |
| *H02K 9/193* | (2006.01) |
| *H02K 9/14* | (2006.01) |

(52) U.S. Cl.
CPC .............. *H02K 9/19* (2013.01); *H02K 1/32* (2013.01); *H02K 9/00* (2013.01); *H02K 9/04* (2013.01); *H02K 9/193* (2013.01); *H02K 9/20* (2013.01); *H02K 9/14* (2013.01)

(58) Field of Classification Search
CPC .. H02K 1/32; H02K 9/00; H02K 9/19; H02K 9/10; H02K 9/12; H02K 9/14; H02K 9/16; H02K 9/193; H02K 9/197; H02K 9/20; H02K 9/04
USPC ....... 310/54, 55, 56, 57, 58, 59, 60 A, 60 R, 310/61, 52
See application file for complete search history.

(56) References Cited

U.S. PATENT DOCUMENTS

| | | | | |
|---|---|---|---|---|
| 4,429,924 | A | * | 2/1984 | Franz ................... H02K 5/1732 123/196 R |
| 7,208,854 | B1 | * | 4/2007 | Saban ...................... H02K 1/32 310/52 |
| 8,169,110 | B2 | | 5/2012 | Swales et al. |
| 8,884,479 | B2 | | 11/2014 | Burnett et al. |
| 2003/0030333 | A1 | * | 2/2003 | Johnsen ................... H02K 1/32 310/54 |

(Continued)

FOREIGN PATENT DOCUMENTS

JP 2011-87434 4/2011

*Primary Examiner* — Bernard Rojas
*Assistant Examiner* — Alexander Singh
(74) *Attorney, Agent, or Firm* — Finnegan, Henderson, Farabow, Garrett & Dunner, LLP; Jeff A. Greene

(57) ABSTRACT

A cooling assembly is disclosed for use with an electric machine having a housing, a shaft rotatably supported within the housing, a rotor operatively coupled to rotate with the shaft, and a stator annularly surrounding the rotor. The cooling assembly may have an axial passage formed along a longitudinal axis of the shaft and configured to direct cooling oil from a first end of the shaft towards a second end of the shaft opposite the first end of the shaft. The cooling assembly may also have an angled passage fluidly connected to the axial passage and configured to redirect the cooling oil towards a gap between an outer surface of the rotor and an inner surface of the stator. The cooling assembly may further have an arcuate groove formed along the outer surface of the rotor and configured to sling the cooling oil towards opposing ends of the rotor.

18 Claims, 2 Drawing Sheets

(56) References Cited

U.S. PATENT DOCUMENTS

| | | | | |
|---|---|---|---|---|
| 2013/0038151 A1* | 2/2013 | Ohashi | ............... | H02K 1/32 |
| | | | | 310/59 |
| 2013/0076170 A1 | 3/2013 | Adra et al. | | |
| 2013/0334912 A1* | 12/2013 | Tokunaga | ............ | H02K 9/19 |
| | | | | 310/54 |
| 2015/0048699 A1 | 2/2015 | Ribarov et al. | | |

* cited by examiner

ELECTRIC MACHINE HAVING ROTOR AND STATOR COOLING ASSEMBLY

TECHNICAL FIELD

The present disclosure relates generally to an electric machine and, more particularly, to an electric machine having a rotor and stator cooling assembly.

BACKGROUND

Electric machines, such as motors and generators, are used to generate mechanical power in response to an electrical input or to generate electrical power in response to a mechanical input. Magnetic, resistive, and mechanical losses within the motors and generators during mechanical and electrical power generation cause a build up of heat, which is dissipated to avoid malfunction and/or failure of the electric machine. One of the limitations on the power output of an electric machine is the capacity of the electric machine to dissipate this heat.

One exemplary arrangement for dissipating heat within an electric machine is disclosed in U.S. Patent Application No. 2015/0048699 to Riharov et al. that published on Feb. 19, 2015 ("the '699 publication"). Specifically, the '699 publication discloses a generator having an open-loop cooling system. The generator includes a rotor body and a stator circumferentially surrounding the rotor body. The rotor body includes an interior rotor cooling path extending from a cooling inlet at an end portion of the rotor body to a cooling outlet at an exterior surface of the rotor body. The exterior surface of the rotor body and an interior surface of the stator cooperate to define an axially extending gap. The gap forms an exterior cooling path fluidly coupling the cooling outlet with the external environment. As coolant travels through the interior rotor cooling path and the exterior cooling path, the rotor body and the stator are gradually cooled.

Although the arrangement of the '699 publication may help to improve cooling of the rotor body and the stator, the arrangement may be less than optimal. In particular, the arrangement may disrupt a magnetic flux of the rotor body because of how the interior rotor cooling path is machined into the rotor body. Specifically, the cooling outlet associated with the interior rotor cooling path is positioned vertically within the rotor body, which separates one or more laminations of the rotor body, thereby reducing the magnetic flux of the rotor body and reducing performance and efficiency of the generator. In addition, the arrangement of the '699 publication may also provide excess coolant to the gap between the exterior surface of the rotor body and the interior surface of the stator. The excess coolant may cause a large amount of friction between the rotor and the stator, which can also reduce performance and efficiency of the generator.

The disclosed electric machine is directed to overcoming one or more of the problems set forth above.

SUMMARY

In one aspect, the present disclosure is directed to a cooling assembly for use with an electric machine having a housing, a shaft rotatably supported within the housing, a rotor operatively coupled to rotate with the shaft, and a stator annularly surrounding the rotor. The cooling assembly may include an axial passage formed along a longitudinal axis of the shaft and configured to direct cooling oil from a first end of the shaft towards a second end of the shaft opposite the first end of the shaft. The cooling assembly may also include an angled passage fluidly connected to the axial passage and configured to redirect the cooling oil towards a gap between an outer surface of the rotor and an inner surface of the stator. The cooling assembly may further include an arcuate groove formed along the outer surface of the rotor and configured to sling the cooling oil towards opposing ends of the rotor.

In another aspect, the present disclosure is directed to a cooling assembly for use with an electric machine having a housing, a shaft rotatably supported within the housing, a rotor operatively coupled to rotate with the shaft, and a stator annularly surrounding the rotor. The cooling assembly may include an axial passage formed along a longitudinal axis of the shaft and configured to direct cooling oil from a first end of the shaft towards a second end of the shaft opposite the first end of the shaft. The cooling assembly may also include a plurality of angled passages fluidly connected to the axial passage and configured to redirect the cooling oil towards a gap between an outer surface of the rotor and an inner surface of the stator, and a plurality of arcuate grooves formed along the outer surface of the rotor and configured to sling the cooling oil towards opposing ends of the rotor. The cooling assembly may further include a plurality of first radial passages located at the first end of shaft and configured to sling the cooling oil radially outward towards ends of the rotor and the stator proximate the first end of the shaft, and a plurality of second radial passages located at the second end of shaft and configured to sling the cooling oil radially outward towards ends of the rotor and the stator proximate the second end of the shaft.

In yet another aspect, the present disclosure is directed to an electric machine. The electric machine may include a housing, a shaft rotatably supported within the housing, a rotor operatively coupled to rotate with the shaft, and a stator annularly surrounding the rotor. The electric machine may also include a cooling assembly. The cooling assembly may include an axial passage formed along a longitudinal axis of the shaft and configured to direct cooling oil from a first end of the shaft towards a second end of the shaft opposite the first end of the shaft. The cooling assembly may also include a plurality of angled passages fluidly connected to the axial passage and configured to redirect the cooling oil towards a gap between an outer surface of the rotor and an inner surface of the stator, and a plurality of arcuate grooves formed along the outer surface of the rotor and configured to sling the cooling oil towards opposing ends of the rotor. The cooling assembly may further include a plurality of first radial passages located at the first end of shaft and configured to sling the cooling oil radially outward towards ends of the rotor and the stator proximate the first end of the shaft, and a plurality of second radial passages located at the second end of shaft and configured to sling the cooling oil radially outward towards ends of the rotor and the stator proximate the second end of the shaft.

DETAILED DESCRIPTION

Figure 1:
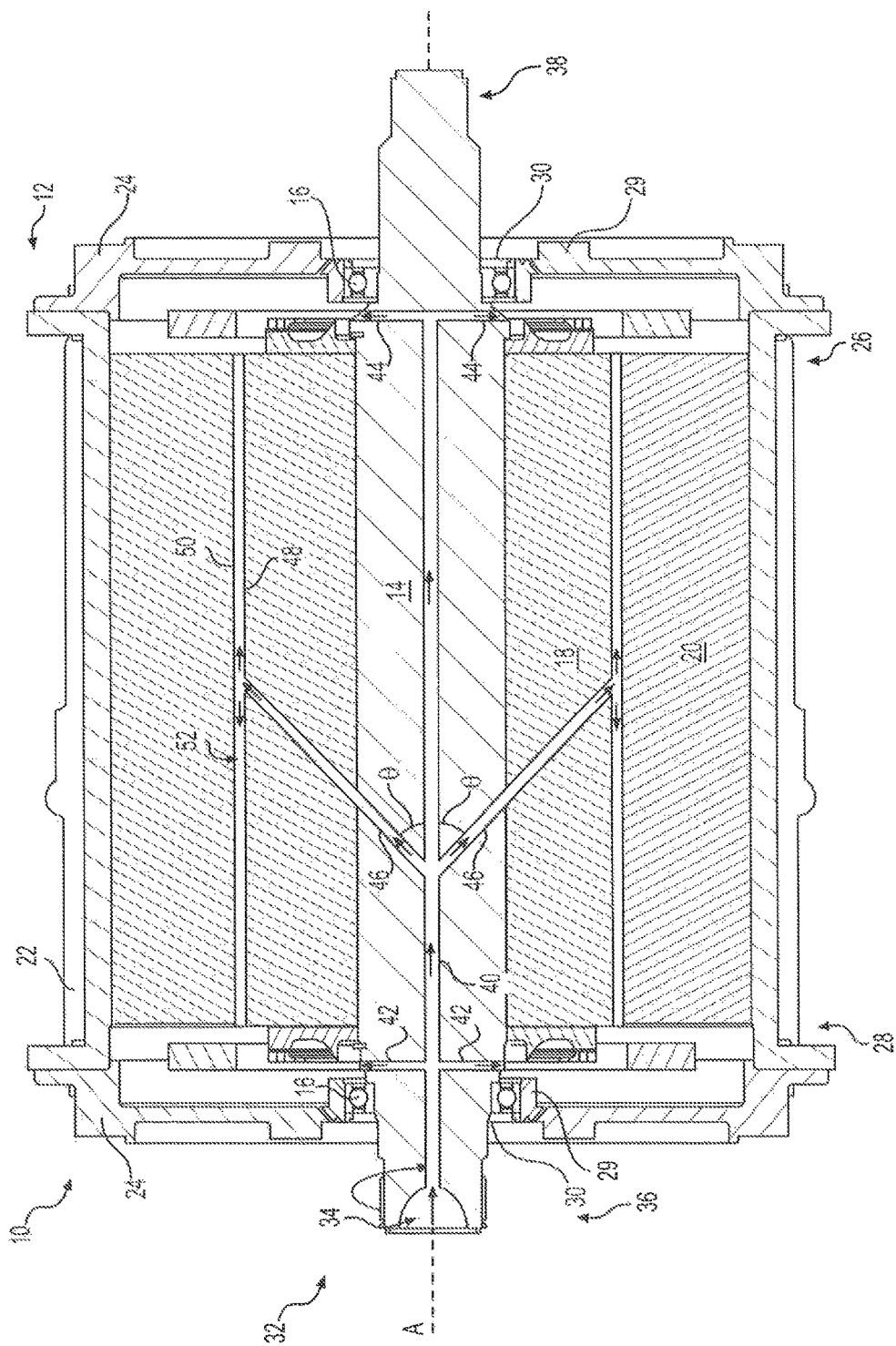
FIG. 1 is a cross-sectional illustration of an exemplary disclosed electric machine.

FIG. 1 illustrates an exemplary electric machine 10. Electric machine 10 may be a generator or a motor, or selectively function as both a generator and a motor. For example, electric machine 10 may be driven (e.g., by an engine) to produce electricity, such as in a hybrid vehicular application or a stationary power generation application. Alternatively, electric machine 10 may be powered with electricity to produce a mechanical rotation, such as in an engine starting application or an electric winching application. It is also contemplated that electric machine 10 may function in some instances as a generator and in other instances as a motor, such as in an electric powertrain propelling and braking application.

Regardless of the application, electric machine 10 may include, among other things, a housing 12, a shaft 14 rotatably supported within housing 12 at opposing ends by bearings 16, a rotor 18 operatively coupled to rotate with shaft 14, and a fixed stator 20 that annularly surrounds rotor 18. When shaft 14 and rotor 18 are mechanically driven to rotate within housing 12 and bearings 16, an associated rotating magnetic field may produce an electric current within stator 20. Likewise, when an electric current is passed through stator 20, a magnetic field may be generated that causes rotor 18 and shaft 14 to rotate. It is contemplated that electric machine 10 may contain additional or different components such as, for example, a control system, a processor, power electronics, one or more sensors, a power storage device, and/or other components known in the art.

Housing 12 may generally consist of a shell 22 and two end covers 24. As shown in FIG. 1, shell 22 may be tubular, having a first open end 26 and an opposing second open end 28. Shell 22 may substantially enclose shaft 14, bearings 16, rotor 18, and stator 20, while end covers 24 may be configured to engage and close off open ends 26, 28 of shell 22. It is contemplated that, in some embodiments, shell 22 may have one open end and one closed end, instead of two open ends, and only one end cover, if desired. Each end cover 24 may include a collar 29 that protrudes axially inward to provide mounting for bearings 16, and a centrally located through-hole 30 that allows the extension of shaft 14 through the opposing open ends 26, 28 of housing 12. It is contemplated that shaft 14 may alternatively protrude through only one end cover 24 or through only one end 26, 28 of shell 22, if desired.

Rotor 18 may be fixedly connected to shaft 14 to interact with a magnetic field within electric machine 10 in response to a rotation of shaft 14. In one embodiment, rotor 18 may include a stack of steel laminates and multiple radially protruding portions also known as rotor teeth. As each protruding portion is rotated to interact with the magnetic field of stator 20, a corresponding current may be produced.

Stator 20 may be fixed to housing 12 to produce the magnetic field that interacts with the radially protruding portions of the steel laminates. Like rotor 18, stator 20 may also include laminates of steel formed into teeth. The teeth of stator 20 may protrude radially inward toward the outwardly protruding rotor teeth of rotor 18. In some applications, stator 20 may also include an iron sleeve surrounding the ring of laminations, and windings of copper wire attached to each stator tooth to form a plurality of poles. As rotor 18 is rotated to interact with the magnetic field of stator 20, electrical current may be sequentially generated from the windings through each of the plurality of poles.

As illustrated in FIG. 1, electric machine 10 may include an internal cooling assembly 32 configured to direct a cooling oil throughout or near the primary heat-generating components of electric machine 10. In one example, the oil may enter housing 12 via an inlet port 34 located at a first end 36 of shaft 14 and flow axially through shaft 14 towards a second end 38 of shaft 14. The oil may be provided from an external supply (e.g., by way of an external rail, which is not shown). While flowing from first end 36 to second end 38, the oil may pass through a centrally located axial passage 40 within shaft 14.

As the oil passes through axial passage 40, the oil may be directed to one or more parts of electric machine 10 (e.g., rotor 18 and stator 20) via one or more distribution passages. For example, at opposing ends 36, 38 of shaft 14, the oil may be directed to first and second radial passages 42, 44, respectively, where the oil is slung radially outward and functions to cool the outer windings of rotor 18 and stator 20. For the purposes of this disclosure, the terms "sling" and "slung" mean directing the oil with the help of centrifugal forces acting on the oil. In addition, at a location in between radial passages 42, 44, the oil may be directed to angled passages 46, where the oil functions to cool a center region of rotor 18 and stator 20. Angled passages 46 may introduce the oil to a gap 52 between an outer surface 48 of rotor 18 and an inner surface 50 of stator 20.

Figure 2:
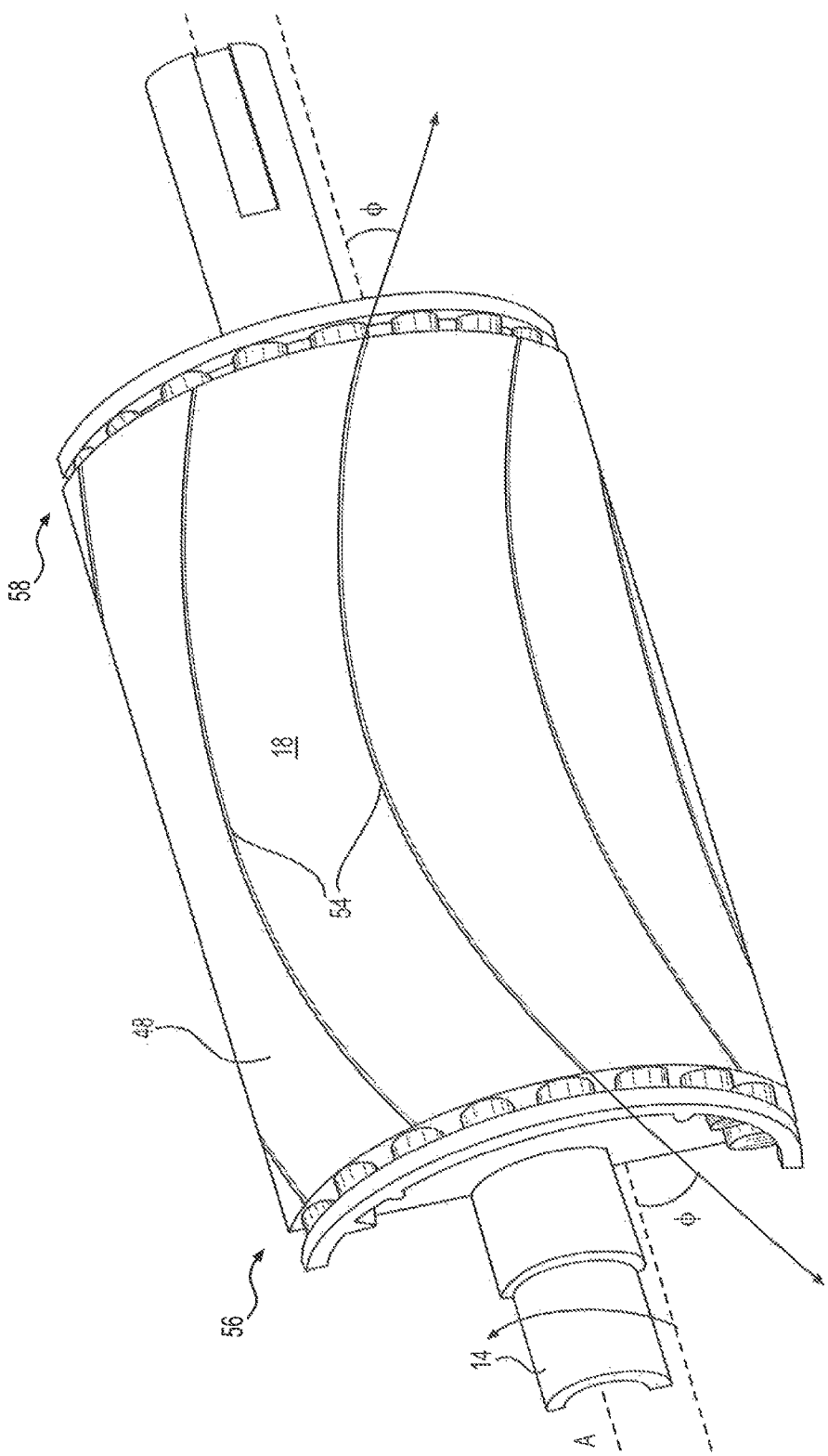
FIG. 2 is a pictorial illustration of an exemplary disclosed rotor that may be used in conjunction with the electric machine of FIG. 1.

As shown in FIG. 2, as the oil reaches gap 52, the oil may be redirected into one or more arcuate grooves 54, where the oil is slung towards opposing ends 56, 58 of rotor 18. The cooling oil may then exit electric machine 10 in any manner known in the art (e.g., by way of a sump, one or more discharge ports, and/or a termination box), and be directed to a heat exchanger (not shown). Within the heat exchanger, the previously absorbed heat can be transferred to the atmosphere before returning back to electric machine 10.

Referring back to FIG. 1, axial passage 40 may be formed along a longitudinal axis A of shaft 14. Radial passages 42, 44 may be formed at opposing ends 36, 38 of shaft 14, respectively, and may extend from longitudinal axis A of shaft 14 to an outer surface of shaft 14. Although there are only two radial passages 42 and two radial passages 44 shown in FIG. 1, it is contemplated that there may be any number of radial passages 42, 44 spaced apart circumferentially around longitudinal axis A of shaft 14.

Angled passages 46 may be formed partially within shaft 14 and partially within rotor 18. Angled passages 46 may extend from longitudinal axis A of shaft 14 towards outer surface 48 of rotor 18. More specifically, each angled passage 46 may extend from a point along longitudinal axis A in between first end 34 of shaft 14 and a lengthwise center of shaft 14 to a point along outer surface 48 at a lengthwise center of rotor 18. Like radial passages 42, 44, although there are only two angled passages 46 shown in FIG. 1, it is contemplated that there may be any number of angled passages 46 spaced apart circumferentially around longitudinal axis A of shaft 14.

Angled passages 46 may be formed at an oblique angle θ with respect to longitudinal axis A of shaft 14. For example, angle θ may be about 30-60° with respect to longitudinal axis A of shaft 14. In one embodiment, angle θ may be about 45° with respect to the longitudinal axis A of shaft 14. Forming angled passages 46 within this particular angle range may help to prevent reduction of magnetic flux in rotor 18. For instance, if the angled passage were to have an angle of greater than 60° (e.g., 90°), then this may cause one or more laminates of rotor 18 to be separated, which would reduce the magnetic flux of rotor 18 and the performance of electric machine 10. On the other hand, if the angled passage were to have an angle of less than 30° (e.g., 15°), then there may not be sufficient space within electric machine 10 to form the angled passage and reach gap 52. Thus, by having angle θ be about 30-60° with respect to longitudinal axis A of shaft 14, the magnetic flux of rotor 18 will not be significantly reduced and there will be sufficient space within electric machine 10 to form angled passage 46 in a manner that reaches gap 52.

Referring back to FIG. 2, grooves 54 may be circumferentially spaced apart around outer surface 48 of rotor 18. Each groove 54 may be arcuate shaped and extend from first end 56 of rotor 18 to second end 58 of rotor 18. In addition, each groove 54 may be formed, such that oil exits either first end 56 or second end 58 at an oblique angle φ with respect to longitudinal axis A of shaft 14. For example, angle φ may be about 20-40° with respect to longitudinal axis A of shaft 14. In one embodiment, angle φ may be about 30° with respect to longitudinal axis A of shaft 14. Forming grooves 54 within this particular angle range may help to improve the efficiency of removing oil from gap 52. For instance, if the grooves were to have an exit angle of greater than 40° (e.g., 60°), then a smaller amount of cooling oil may be forced away from gap 52 because there would be fewer grooves on outer surface 48. On the other hand, if the grooves were to have an exit angle of less than 20° (e.g., 10°), then cooling oil would be forced away from gap 52 at a slower rate. Thus, by having angle φ be about 20-40° with respect to longitudinal axis A of shaft 14, a significant amount of cooling oil may be removed from gap 52 at a quicker rate. As a result, there may be less friction between rotor 18 and stator 20 when the oil is introduced to gap 52.

INDUSTRIAL APPLICABILITY

The disclosed electric machine finds potential application in any power system where it is desirable to dissipate substantial amounts of heat in a controlled and uniform manner. The disclosed electric machine finds particular applicability in vehicle drive systems. However, one skilled in the art will recognize that the disclosed electric machine could be utilized in relation to other drive systems that may or may not be associated with a vehicle. The heat-transferring operation of electric machine 10 will now be described.

Referring to FIG. 1, as the flow of the cooling oil enters electric machine 10, it may be directed axially via inlet port 32 and then through axial passage 40 in shaft 14. As the oil flows within axial passage 40, some of the oil may be slung radially outward through radial passages 42 towards windings of rotor 18 and stator 20 proximate first end 36 of shaft 14. The remaining oil may continue to flow through axial passage 40 toward second end 38 of shaft 14 until the oil reaches angled passages 46. At angled passages 46, some of the oil may be redirected radially outward at an oblique angle θ with respect to longitudinal axis A of shaft 14 towards the center region of rotor 18 and stator 20. The remaining oil may continue to flow through axial passage 40 until reaching radial passages 44 at second end 38 of shaft 14, where the rest of the oil is slung radially outward through radial passages 44 towards windings of rotor 18 and stator 20 proximate second end 38 of shaft 14.

Referring to FIG. 2, the oil from angled passages 46 may be directed into gap 52 between outer surface 48 of rotor 18 and inner surface 50 of stator 20, where the oil is slung from the lengthwise center of rotor 18 to opposing ends 56, 58 of stator 18 via grooves 54. The cooling oil flowing through cooling assembly 32 may absorb thermal energy from one or more components of electric machine, particularly, rotor 18 and stator 20.

Greater cooling efficiency of electric machine 10 may be realized because the heat-transferring oil is directed to components within electric machine 10 that are generally difficult to reach and generate large amounts of heat. Specifically, angled passages 46 may allow cooling oil to reach the center region of rotor 18 and stator 20 without having to remove any part of electric machine 10. In addition, grooves 54 may provide a more efficient outlet for oil between rotor 18 and stator 20, such that performance of electric machine 10 is not significantly reduced. Additional advantages may be realized because radial passages 42, 44 direct the cooling oil to opposing ends of rotor 18 and stator 20. In particular, the disclosed cooling assembly 32 may provide a simplified configuration for cooling oil to reach many of the components within electric machine 10 that tend to generate the greatest amount of heat.

It will be apparent to those skilled in the art that various modifications and variations can be made to the electric machine of the present disclosure. Other embodiments of the electric machine will be apparent to those skilled in the art from consideration of the specification and practice of the electric machine disclosed herein. It is intended that the specification and examples be considered as exemplary only, with a true scope of the disclosure being indicated by the following claims and their equivalents.

What is claimed is:

1. A cooling assembly for an electric machine having a housing, a shaft rotatably supported within the housing, a rotor operatively coupled to rotate with the shaft, and a stator annularly surrounding the rotor, the cooling assembly comprising:
    an axial passage formed along a longitudinal axis of the shaft and configured to direct cooling oil from a first end of the shaft towards a second end of the shaft opposite the first end of the shaft;
    an angled passage fluidly connected to the axial passage at an oblique angle and configured to redirect the cooling oil towards a gap between an outer surface of a central region of an outer surface of the rotor and an inner surface of the stator; and
    an arcuate groove formed along the outer surface of the rotor, the angled passage introduces cooling oil into an apex of the arcuate groove at the central region of the outer surface of the rotor, the arcuate groove extending from a first end of the rotor to a second end of the rotor and configured to sling the cooling oil to the opposing ends of the rotor.

2. The cooling assembly of claim 1, wherein the angled passage is formed partially within the shaft and partially within the rotor.

3. The cooling assembly of claim 2, wherein the angled passage extends from a point along the longitudinal axis of the shaft in between the first end of the shaft and a lengthwise center of the shaft to a point along the outer surface of the rotor at a lengthwise center of the rotor.

4. The cooling assembly of claim 2, wherein the angled passage is formed at an angle of about 30-60° with respect to the longitudinal axis of the shaft.

5. The cooling assembly of claim 2, wherein the angled passage includes a plurality of angled passages circumferentially spaced apart about the longitudinal axis of the shaft.

6. The cooling assembly of claim 1, wherein the arcuate groove is formed, such that the cooling oil exits the arcuate groove at an angle of about 20-40° with respect to the longitudinal axis of the shaft.

7. The cooling assembly of claim 1, wherein the arcuate groove includes a plurality of arcuate grooves circumferentially spaced apart around the outer surface of the rotor.

8. The cooling assembly of claim 1, further including:
a first radial passage located at the first end of shaft and configured to sling the cooling oil radially outward towards ends of the rotor and the stator proximate the first end of the shaft; and
a second radial passage located at the second end of shaft and configured to sling the cooling oil radially outward towards ends of the rotor and the stator proximate the second end of the shaft.

9. The cooling assembly of claim 8, wherein the first and second radial passages extend from the longitudinal axis of the shaft to an outer surface of the shaft.

10. The cooling assembly of claim 8, wherein:
the first radial passage includes a plurality of first radial passages circumferentially spaced apart about the longitudinal axis of the shaft; and
the second radial passage includes a plurality of second radial passages circumferentially spaced apart about the longitudinal axis of the shaft.

11. The cooling assembly of claim 1, further including an inlet port located at the first end of the shaft and configured to introduce the cooling oil to the axial passage.

12. A cooling assembly for an electric machine having a housing, a shaft rotatably supported within the housing, a rotor operatively coupled to rotate with the shaft, and a stator annularly surrounding the rotor, the cooling assembly comprising:
an axial passage formed along a longitudinal axis of the shaft and configured to direct cooling oil from a first end of the shaft towards a second end of the shaft opposite the first end of the shaft;
a plurality of angled passages fluidly connected to the axial passage at oblique angles and configured to redirect the cooling oil towards a gap between a central region of an outer surface of the rotor and an inner surface of the stator;
a plurality of arcuate grooves formed along the outer surface, the plurality of angled passages introduce cooling oil into an apex of the plurality of arcuate grooves at the central region of the outer surface of the rotor, the plurality of arcuate grooves extending from a first end of the rotor to a second end of the rotor and configured to sling the cooling oil to the opposing ends of the rotor;
a plurality of first radial passages located at the first end of shaft and configured to sling the cooling oil radially outward towards ends of the rotor and the stator proximate the first end of the shaft; and
a plurality of second radial passages located at the second end of shaft and configured to sling the cooling oil radially outward towards ends of the rotor and the stator proximate the second end of the shaft.

13. The cooling assembly of claim 12, wherein each of the plurality of angled passages is formed partially within the shaft and partially within the rotor.

14. The cooling assembly of claim 13, wherein each of the plurality of angled passages extends from a point along the longitudinal axis of the shaft in between the first end of the shaft and a lengthwise center of the shaft to a point along the outer surface of the rotor at a lengthwise center of the rotor.

15. The cooling assembly of claim 13, wherein each of the plurality of angled passages is formed at an angle of about 30-60° with respect to the longitudinal axis of the shaft.

16. The cooling assembly of claim 12, wherein each of the plurality of arcuate grooves is formed, such that the cooling oil exits the respective arcuate groove at an angle of about 20-40° with respect to the longitudinal axis of the shaft.

17. The cooling assembly of claim 12, wherein each of the plurality of first and second radial passages extend from the longitudinal axis of the shaft to an outer surface of the shaft.

18. An electric machine, comprising:
a housing;
a shaft rotatably supported within the housing;
a rotor operatively coupled to rotate with the shaft;
a stator annularly surrounding the rotor; and
a cooling assembly including:
an axial passage formed along a longitudinal axis of the shaft and configured to direct cooling oil from a first end of the shaft towards a second end of the shaft opposite the first end of the shaft;
a plurality of angled passages fluidly connected to the axial passage at oblique angles and configured to redirect the cooling oil towards a gap between an outer surface of a central region of the rotor and an inner surface of the stator;
a plurality of arcuate grooves formed along the outer surface, the plurality of angled passages introduce cooling oil into an apex of the plurality of arcuate grooves at the central region of the outer surface of the rotor, the plurality of arcuate grooves extending from a first end of the rotor to a second end of the rotor and configured to sling the cooling oil to the opposing ends of the rotor;
a plurality of first radial passages located at the first end of shaft and configured to sling the cooling oil radially outward towards ends of the rotor and the stator proximate the first end of the shaft; and
a plurality of second radial passages located at the second end of shaft and configured to sling the cooling oil radially outward towards ends of the rotor and the stator proximate the second end of the shaft.

* * * * *